US 9,127,888 B2

(12) United States Patent
Mason

(10) Patent No.: US 9,127,888 B2
(45) Date of Patent: Sep. 8, 2015

(54) INDUSTRIAL OVEN FOR CURING COMPOSITE MATERIAL STRUCTURES

(75) Inventor: Dave Mason, Calabasas, CA (US)

(73) Assignee: ASC PROCESS SYSTEMS, Valencia, CA (US)

( * ) Notice: Subject to any disclaimer, the term of this patent is extended or adjusted under 35 U.S.C. 154(b) by 1138 days.

(21) Appl. No.: 12/859,148

(22) Filed: Aug. 18, 2010

(65) Prior Publication Data

US 2012/0003597 A1 Jan. 5, 2012

Related U.S. Application Data

(60) Provisional application No. 61/361,134, filed on Jul. 2, 2010.

(51) Int. Cl.
*F27B 5/14* (2006.01)
*F27B 17/00* (2006.01)
*B29C 35/02* (2006.01)

(52) U.S. Cl.
CPC .......... *F27B 17/0083* (2013.01); *B29C 35/02* (2013.01); *B29C 35/0227* (2013.01)

(58) Field of Classification Search
USPC ............................................ 432/10, 225, 206
See application file for complete search history.

(56) References Cited

U.S. PATENT DOCUMENTS 1,744,817 A * 1/1930 Ward ............................. 34/224
2,822,798 A * 2/1958 Ipsen ........................ 126/91 A (Continued)

FOREIGN PATENT DOCUMENTS

DE 10 2005 05723 A1 5/2007
DE 20 2008 01119 U1 11/2008

(Continued)

OTHER PUBLICATIONS

European Search Report mailed on Sep. 26, 2011 in EP Application No. 11172302.9.

(Continued)

*Primary Examiner* — Alissa Tompkins
*Assistant Examiner* — Nathaniel Herzfeld
(74) *Attorney, Agent, or Firm* — Knobbe, Martens, Olson & Bear, LLP

(57) ABSTRACT

An industrial oven system for curing composite material parts can include an oven compartment configured to receive a composite material structure therein that extends along a majority of the length and/or width of the compartment, the compartment having an inner wall that defines a cavity between proximal and distal ends of the compartment. A shroud can be disposed circumferentially between the inner wall of the compartment and an outer wall of the composite material structure. The shroud defines a first longitudinal annular channel between the inner wall and an outer surface of the shroud, and defines a second longitudinal annular channel between the outer wall of the composite material structure and an inner surface of the shroud. The shroud is contoured to direct a heated airflow longitudinally along the annular channels and over the composite material structure to cure the composite material structure, the heated airflow generally being at a higher temperature than a surface of the composite material part. One or more contour elements of the shroud can direct more heat to a corresponding thicker portion of the composite material structure generally aligned with the contour element relative to an amount of heat directed to adjacent relatively thinner portions of the composite material structure so as to effect a desired heating rate of the composite material structure to achieve a substantially uniform temperature along substantially the entire length of the composite material structure, thereby inhibiting warping of the composite material structure during a curing process.

21 Claims, 11 Drawing Sheets

(56) References Cited

U.S. PATENT DOCUMENTS

| | | | |
|---|---|---|---|
| 3,516,649 A | 6/1970 | Endo | |
| 3,605,717 A | 9/1971 | Sauer | |
| 3,668,817 A | 6/1972 | Bell | |
| 3,719,180 A | 3/1973 | Pere | |
| 4,039,278 A * | 8/1977 | Denholm | 432/144 |
| 4,094,631 A | 6/1978 | Grieve | |
| 4,162,141 A * | 7/1979 | West | 432/144 |
| 4,381,442 A | 4/1983 | Guibert | |
| 4,484,561 A * | 11/1984 | Baggott et al. | 126/21 A |
| 4,512,327 A | 4/1985 | Stiegler | |
| 4,559,903 A | 12/1985 | Bloom et al. | |
| 4,676,743 A * | 6/1987 | Ross | 432/152 |
| 4,722,683 A * | 2/1988 | Royer | 432/152 |
| 4,733,481 A * | 3/1988 | Hubbert | 34/666 |
| 4,813,398 A | 3/1989 | Savage | |
| 4,906,182 A * | 3/1990 | Moller | 432/77 |
| 4,966,546 A | 10/1990 | Wu | |
| 4,974,663 A * | 12/1990 | Nakaji | 165/61 |
| 5,127,827 A * | 7/1992 | Hoetzl et al. | 432/72 |
| 5,588,830 A | 12/1996 | Josefsson et al. | |
| 6,394,796 B1 | 5/2002 | Smith | |
| 6,872,918 B2 | 3/2005 | Toll | |
| 2010/0098927 A1 | 4/2010 | Boyd et al. | |
| 2011/0115137 A1 | 5/2011 | Sarres et al. | |

FOREIGN PATENT DOCUMENTS

| | | |
|---|---|---|
| EP | 0 002 784 A1 | 7/1979 |
| SU | 950424 A1 * | 8/1982 |
| WO | WO 2007-062780 | 6/2007 |

OTHER PUBLICATIONS

Monaghan, M. R., et al: "Development of a Computer Controlled Autoclave for Forming Thermoplastic Composites", Composites Manufacturing, Mar. 1, 1990 pp. 8-14, vol. 1, No. 1, XPOO0291962, ISSN: 0956-7143, Butterworth Scientific, Guildford, Surrey, GB.

* cited by examiner

INDUSTRIAL OVEN FOR CURING COMPOSITE MATERIAL STRUCTURES

CROSS-REFERENCE TO RELATED APPLICATIONS

This application claims the benefit of U.S. Provisional Patent Application No. 61/361,134 filed Jul. 2, 2010 and titled INDUSTRIAL OVEN FOR CURING COMPOSITE MATERIAL STRUCTURES, the entire contents of which are incorporated herein by reference and should be considered a part of this specification.

BACKGROUND

1. Field

The invention is directed to an industrial oven for curing composite material structures.

2. Description of the Related Art

Over the past two decades, military and commercial aircraft manufacturers have increased the use of composite materials in large aircraft. Among other things, composite materials tend to be lighter than conventional materials (e.g., riveted aluminum and honeycomb structures).

Composite material parts are typically made from multiple layers of "prepreg" (e.g., carbon or fiberglass fabric pre-impregnated with resin) which are draped in multiple directions over a steel, Invar, or aluminum mold (also called a "tool"). The structure is then "bagged," which involves placing high-temperature bagging material over the part and sealing it to the tool surface (e.g., with flexible sealing putty called "tacky tape"). The structure is then cured, which serves to heat the composite material part (and resin) to a sufficiently temperature to melt the resin and cross-link the resin molecules to achieve a cured part. Typically, the final cure temperature is about 250° F. or 350° F. Temperature uniformity of the composite material structure during the curing process is very important because non-uniformity of temperature on the part can result in permanent warping of the structure, thereby changing the structural and aerodynamic stability of the part.

Aerospace autoclaves have been used to cure large composite material structures for aircraft and aerospace parts. An autoclave is a large pressure vessel that incorporates high pressure, high temperature, and vacuum to consolidate, bond and cure composite material structures. However, such autoclaves are expensive to install and operate, and require the installation of a pressurized nitrogen system to deliver pressure to the autoclave, which makes the use of autoclaves not cost effective for use in the manufacturing of large composite structural parts.

Industrial ovens have also been used to cure composite material structures for aircraft and aerospace parts. Such an oven is a large box-shaped unit that has typically been used to cure small non-structural composite material parts and operates by directing heated airflow over the composite material part in a side-to-side, side-to-top, bottom-to-top or top-to-side manner across the width of the oven. Such ovens, unlike autoclaves, operate at atmospheric pressure and so do not apply additional pressure to the composite material structure.

Because most high-performance resin systems require high pressure to achieve high-pressure curing, such ovens have not been deemed suitable for curing most structural composite material parts. Additionally, though such ovens have been used to cure small parts, which can then be bolted together to form larger structures, conventional ovens have various drawbacks that make them unsuitable for curing large parts (e.g., whole wings or fuselages of an aircraft) due to their large size and tight temperature uniformity considerations. Moreover, conventional ovens are not able to achieve uniform heating of such large parts, causing large temperature gradients across the parts that cause structural warping, nor able to heat the large tool and composite materials of aircraft parts (e.g., wings and fuselages) at the typical curing specification rates of 2-5° F./min.

Accordingly, there is a need for an industrial oven that overcomes the drawbacks noted above and can cure large composite material structures, such as aircraft and aerospace parts.

SUMMARY

In accordance with one embodiment, an industrial oven system for curing composite material parts is provided. The oven system comprises an oven compartment having an inner wall that defines a cavity between a proximal end of the compartment and a distal closed end of the compartment, the compartment configured to receive a composite material structure therein that extends along a majority of the length and/or width of the compartment. The oven system further comprises a shroud disposed circumferentially between the inner wall of the compartment and an outer wall of the composite material structure along the length of the composite material structure. The shroud defines a first annular channel between the inner wall and an outer surface of the shroud and defines a second annular channel between the outer wall of the composite material structure and an inner surface of the shroud, said channels extending longitudinally between the proximal and distal ends of the compartment. The shroud is contoured to direct a heated airflow along the annular channels and over the composite material structure to cure the composite material structure, the heated airflow generally being at a higher temperature than a surface of the composite material part. One or more contour elements of the shroud are configured to direct more heat to a corresponding thicker portion of the composite material structure generally aligned with the contour element relative to an amount of heat directed to adjacent relatively thinner portions of the composite material structure so as to effect a desired heating rate of the composite material structure to achieve a substantially uniform temperature along substantially the entire length of the composite material structure, thereby inhibiting warping of the composite material structure during a curing process.

In accordance with another embodiment, a system for curing composite material parts is provided. The system comprises an elongate shroud positionable circumferentially between an inner wall of an industrial oven compartment and an outer wall of a composite material structure along the length of the composite material structure. The shroud defines a first annular channel between the inner wall and an outer surface of the shroud, and defines a second annular channel between the outer wall of the composite material structure and an inner surface of the shroud, said channels extending longitudinally between the proximal and distal ends of the compartment. The shroud is contoured to direct a heated airflow longitudinally along the annular channels and over the composite material structure to cure the composite material structure, the heated airflow generally being at a higher temperature than a surface of the composite material part. One or more contour elements of the shroud are configured to direct more heat to a corresponding thicker portion of the composite material structure generally aligned with the contour element relative to an amount of heat directed to adjacent relatively thinner portions of the composite material structure to effect a desired heating rate of the composite material structure to achieve a substantially uniform temperature along substantially the entire length of the composite material structure, thereby inhibiting warping of the composite material structure during a curing process.

In accordance with another embodiment, a method for curing composite material structures in an industrial oven is provided. The method comprises inserting a tool support structure carrying a composite material structure into an oven compartment having an inner wall that defines a cavity between a proximal end of the compartment and a distal closed end of the compartment, a shroud disposed circumferentially between the inner wall of the compartment and an outer wall of the tool support structure along the length of the tool support structure. The method also comprises flowing a heated airflow longitudinally along a first annular channel between the inner wall of the compartment and an outer surface of the shroud, said heated airflow further generally being at a higher temperature than a surface of the composite material structure and flowing along a second annular channel between the outer wall of the tool support structure and an inner surface of the shroud, said channels extending longitudinally between the proximal and distal ends of the compartment. Flowing the heated airflow comprises directing with one or more contour elements of the shroud relatively more heat via the heated airflow to a corresponding thicker portion of the composite material structure generally aligned with the contour element, and relatively less heat to adjacent relatively thinner portions of the composite material structure to effect a desired heating rate of the composite material structure to achieve a substantially uniform temperature along substantially the entire length of the composite material structure to thereby inhibit warping of the composite material structure during the curing process.

In accordance with another embodiment, a method of manufacturing a shroud for use in an industrial oven for curing a composite material structure is provided. The method comprises modeling an oven, a tool support structure configured to carry a composite material structure and removably positionable in a compartment of the oven, and a shroud disposed between the tool support structure and an inner wall of the compartment with a computational fluid dynamics algorithm, the composite material structure extending along a majority of the length and/or width of the compartment. The method also comprises calculating the heat transfer characteristics of the shroud and composite material structure to be cured by simulating a heated airflow between the inner wall and the shroud, and between the shroud and the tool support structure. The method further comprises using said calculated heat transfer characteristics to determine the heated airflow velocity and/or temperature at a plurality of intervals along the length of the shroud, and the location of one or more contour elements along the length of the shroud, to maintain a substantially uniform temperature that varies no more than about 30° F. to 40° F. along substantially the entire length of the composite material structure.

DETAILED DESCRIPTION

Figure 1A:
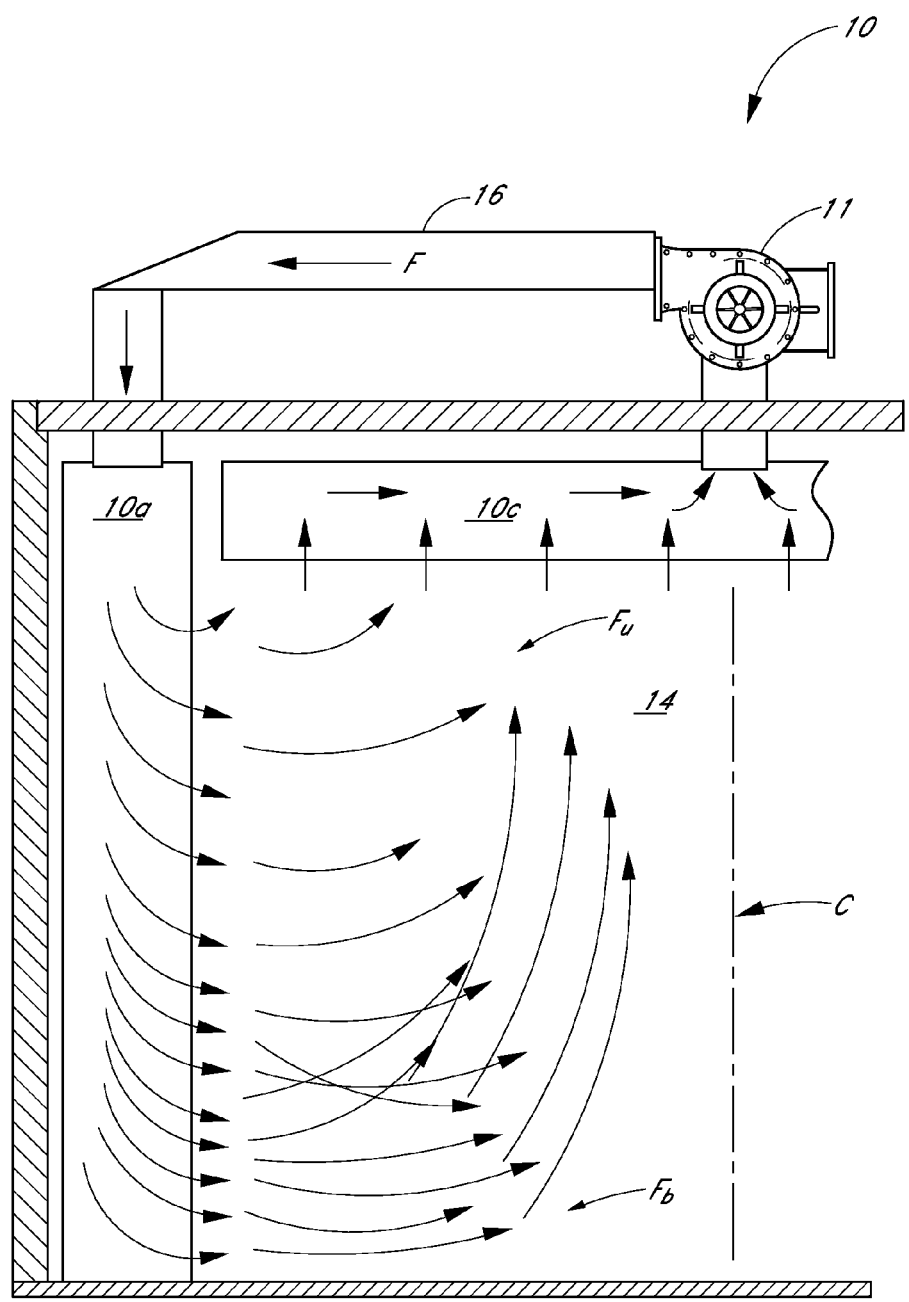
FIGS. 1A-1C are schematic partial cross-sectional views of a conventional oven during operation.
Figure 1B:
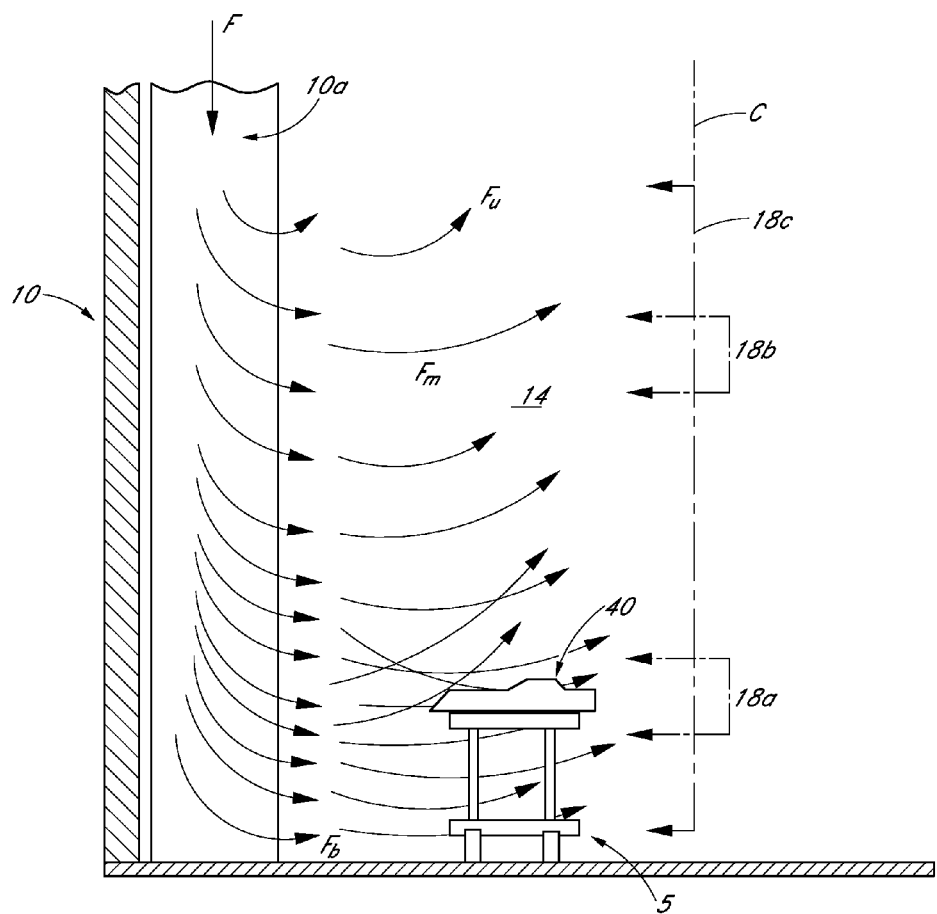
Figure 1C:
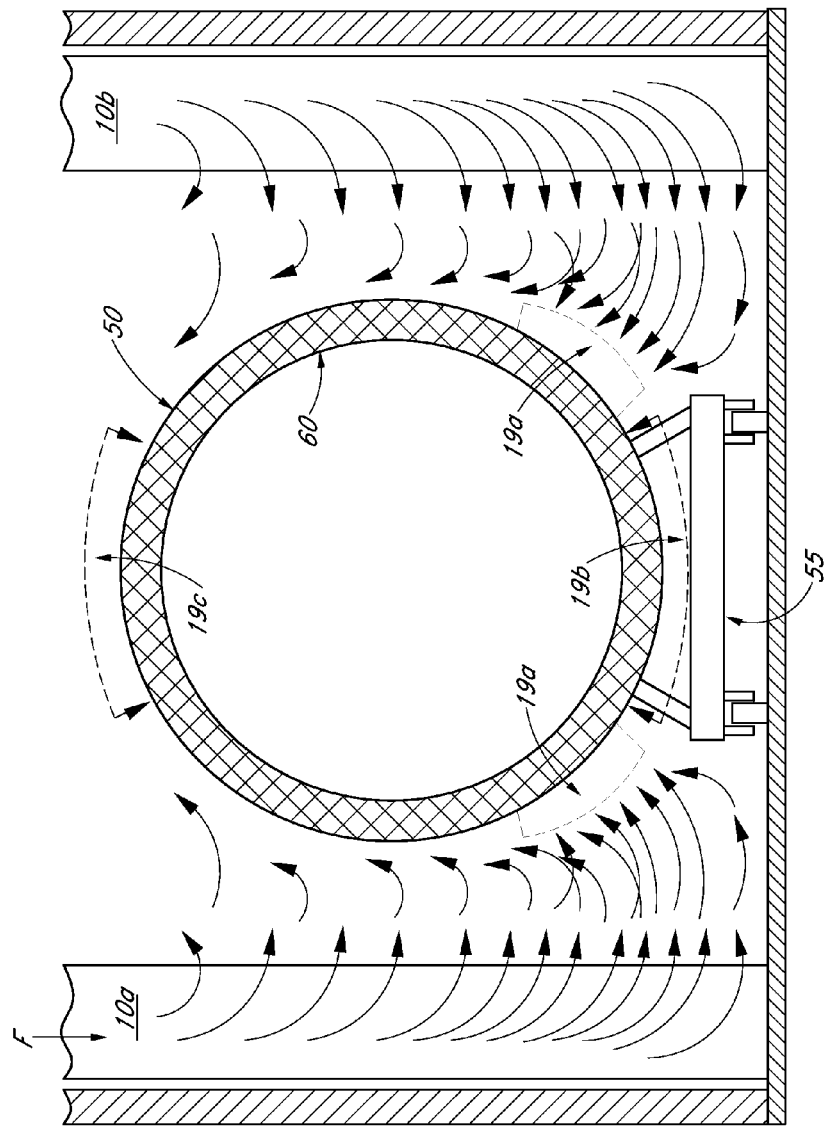

FIGS. 1A-1C show partial views of a conventional industrial oven 10 that has been used previously to cure small components. The oven 10 generally has a box-like body with insulated walls and extends from an open end to a closed end. Left-side and right-side ducts 10a, 10b extend along the length of the oven 10 (i.e., into the page in FIGS. 1A-1C), with an upper duct 10c extending between the left-side and right-side ducts 10a, 10b, also along the length of the oven 10 (i.e., into the page in FIGS. 1A-1C). The ducts 10a-10c preferably have a plurality of openings allowing flow of air into and out of a compartment 14 defined by the ducts 10-10c within the oven 10. In the illustrated embodiment, airflow F enters the compartment 14 from the left-side and right-side ducts 10a, 10b and exits the compartment 14 via the upper duct 10c so that the airflow F follows a side-to-top direction. However, in other embodiments, the airflow enters the compartment 14 from the upper duct and exits the compartment via the left-side and/or right-side duct so that the airflow follows a top-to-side direction. In still another embodiment, the airflow enters the compartment 14 via one of the left and right side ducts and exits the compartment via the other of the left and right side ducts so that the airflow follows a side-to-side direction.

FIG. 1A shows a sectional view of the conventional industrial oven 10 during operation. Only half of the chamber 14 is shown in the figure, as the compartment to the right of the center line C, which is also the line of symmetry of the oven 10, has been omitted for simplicity. However, the omitted portion of the chamber 14 to the right of the center line C would have a flow pattern that mirrors the pattern shown to the left of the center line C in FIG. 1A. As shown, the left-side duct 10a couples to a fan 11 via a connecting duct 16. The fan 11 also couples to the upper duct 10c and right-side duct 10b. The fan draws air from the compartment 14 via apertures (not shown) in the upper duct 10c, and cycles the airflow F back to the compartment 14 via the connecting duct 16 and left and right-side ducts 10a, 10b. As shown in FIG. 1A, operation of the oven 10 results in higher airflow $F_b$ at the bottom of the compartment 14 and relatively slower airflow $F_u$ at the top of the compartment 14 due at least in part to the downward velocity inside the left/right side ducts 10a, 10b.

FIG. 1B is a sectional view of the oven 10 during operation, as shown in FIG. 1A, with a composite material part and tool 40 positioned in the compartment 14 (e.g., on stand 5). As discussed above, operation of the oven 10 results in higher airflow $F_b$ (e.g., higher velocity) at the bottom of the compartment 14 and relatively slower airflow $F_u$ at the top of the compartment 14. Additionally, as shown in FIG. 1B, the airflow F generated within the compartment 14 during operation of the oven 10 results in a region 18a with high airflow $F_h$ (e.g., higher velocity) and good uniformity of airflow. This region 18a is generally toward the bottom of the compartment 14 in the oven 10. The airflow F generated within the compartment 14 also includes a region 18b of airflow $F_m$ that is slower relative to region 18a, but which has generally uniform airflow. The closer to the top of the compartment 14, the slower the air flow $F_u$ exiting from the side left/right side ducts 10a, 10b becomes and the less uniform the airflow becomes. Accordingly, over the region 18c from the bottom of the compartment 14 toward the top of the compartment 14, the oven 10 provides poor uniformity in airflow with a wide variety of airflow speeds.

When the part to be cured is a small composite material part mounted on a tool 40 that can be placed on the support cart 5 so that the part/tool 40 is positioned in the region 18a that exhibits high flow $F_h$ and good uniformity of flow, the oven 10 can provide for generally uniform curing of the part 40. However, when the part is larger (e.g., extends over a majority of the height and/or length of the oven 10), such as an aircraft fuselage tool 50 that supports a composite material part 60, as shown in FIG. 1C disposed on a support structure 55, the oven 10 is unable to provide for uniform curing of the part 60, which results in large temperature gradients across the part 60, causing structural warping. Additionally, the oven 10 is not able to heat a large tool, such as the part 60 at a desired rate (e.g., 2-5° F./min, or other rates having a lower or higher value). As shown in FIG. 1C, operation of the oven 10 results in high airflow regions 19a on the lower sides of the tool 50 that get much hotter than the rest of the tool 50. Additionally, operation of the oven 10 results in minimum airflow regions 19b, 19c on the bottom and top of the tool 50 that get very little airflow, and therefore very little heat transfer from the airflow. Accordingly, operation of the oven 10 disadvantageously results in large temperature differences in different sections of the tool 50, resulting in structural warping.

Figure 2:
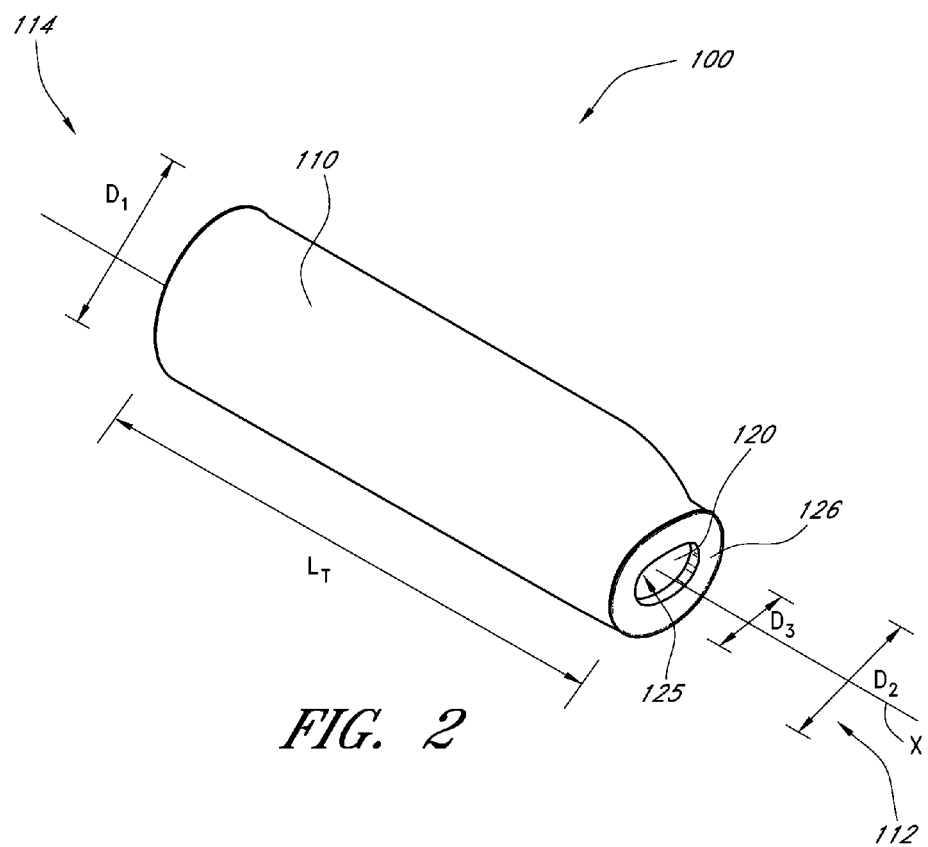
FIG. 2 is a schematic top perspective view of a cylindrical tool for use with an industrial oven.

FIG. 2 shows one embodiment of a tool or tool structure 100 that can be used with the oven 200 (see FIG. 3A) described herein. In the illustrated embodiment, the tool 100 is for an aircraft fuselage. However, the tool 100 can be for other large aircraft parts (e.g., wings), or large parts used in other industries (e.g., automotive, boats). The tool 100 can extend along a length $L_T$ from a proximal end 112 to a distal end 114 along an axis X. In one embodiment, the axis X can be an axis of symmetry. In another embodiment, the axis X can be a central axis. In one embodiment, the tool 100 can be made of metal (e.g., aluminum) or metal alloys (e.g., steel, Invar-36). However, the tool 100 can be made of any suitable material for supporting composite material parts or structures during a curing process. In one embodiment, the tool 100 can weigh between about 20,000 lbs and about 60,000 lbs. In another embodiment, the tool 100 can weigh about 45,000 lbs. However, in other embodiments, the tool 100 can weigh more or less than the values above (e.g., greater than 2,000 lbs). In some embodiments, the tool 100 can have a non-flat configuration (e.g., cylindrical structure, curved structure) and/or vary in thickness along its length $L_T$.

In the illustrated embodiment, the tool 100 is generally cylindrical with an outer diameter D2 at the proximal end 112 and an outer diameter D1 at the distal end 114. In one embodiment, the outer diameter D2 if smaller than the outer diameter D1. In another embodiment, the outer diameter D2 is generally equal to the outer diameter D1. In still another embodiment, the outer diameter D2 is larger than the outer diameter D1. The tool 100 can have other suitable cross-sectional shapes (e.g., oval, square, rectangular) transverse to the axis X in other embodiments and is not limited to a generally circular cross-sectional transverse profile.

With continued reference to FIG. 2, the tool 100 includes an outer surface 110 and an inner surface 120 that defines a longitudinal channel 125 along the length of the tool 100. The longitudinal channel 125 can have an opening 126 at the proximal end 112 with a diameter D3. A composite material can be laid-up on the inner surface 120 of the tool 100, to form a composite material part 150 (see FIG. 3B), prior to positioning the tool 100 in the over 200. For example, multiple layers of carbon or fiberglass fabric impregnated with resin (e.g., prepreg) can be laid-up onto the inner surface 120 and bagged, as described above. In other embodiments, other suitable materials can be used for the prepreg that is laid-up onto the inner surface 120 to form the composite material part 150. In one embodiment, the composite material part 150 can be made entirely of a multi-layered fabric, as described above. In another embodiment, the composite material part 150 can also include a honeycomb and composite prepreg. In one embodiment, the composite material part 150 can have a thickness t (see FIG. 5) that varies between about 0.25 inches and about 2 inches along the length $L_T$ of the tool 100. However, in other embodiments, the thickness of the composite material part 150 can have other values that are smaller or greater than those given above. In some embodiments, the thickness of the composite material part 150 can be generally constant along the length $L_T$ of the tool 100. In one embodiment, the composite material part 150 can have a generally constant density along substantially the entire length $L_T$ of the tool 100. In another embodiment, the composite material part 150 can include regions of varying density along its length, with relatively higher density portions adjacent to relatively lower density portions.

In one embodiment, the composite material part 150 can weigh between about 1,000 lbs and about 10,000 lbs. In another embodiment, the composite material part 150 can weigh about 5,000 lbs. However, in other embodiments, the composite material part 150 can weigh more or less than the values give above.

The tool 100 can also include a rib structure (not shown) attached to the outer surface 110 to provide structural support to the outer surface 110. The rib structure can include one or more circumferential ribs and one or more longitudinal ribs that intersect the one or more circumferential ribs. Preferably, the ribs define openings therethrough that allow airflow to contact the outer surface 110. In one embodiment, the ribs can have a thickness of about ½ inch. However, in other embodiments, the ribs can have smaller or larger thicknesses.

Figure 3A:
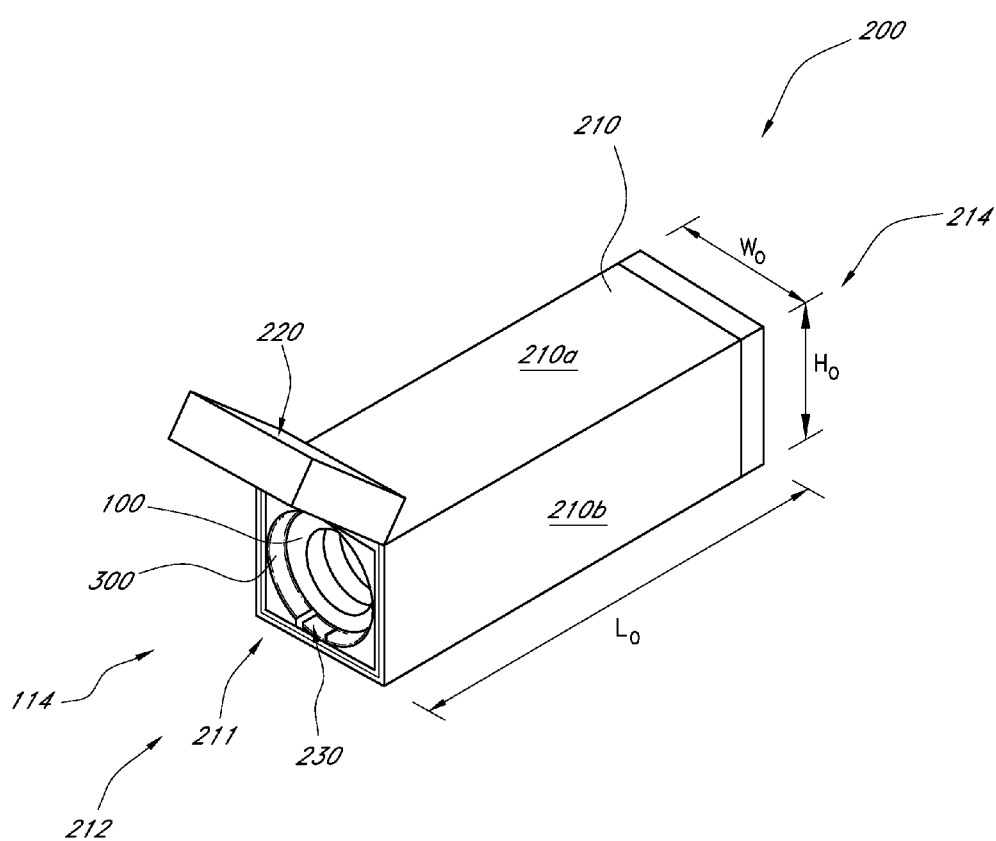
FIG. 3A is a schematic perspective top view one embodiment of an industrial oven and shroud for use with the tool of FIG. 2.
Figure 3B:
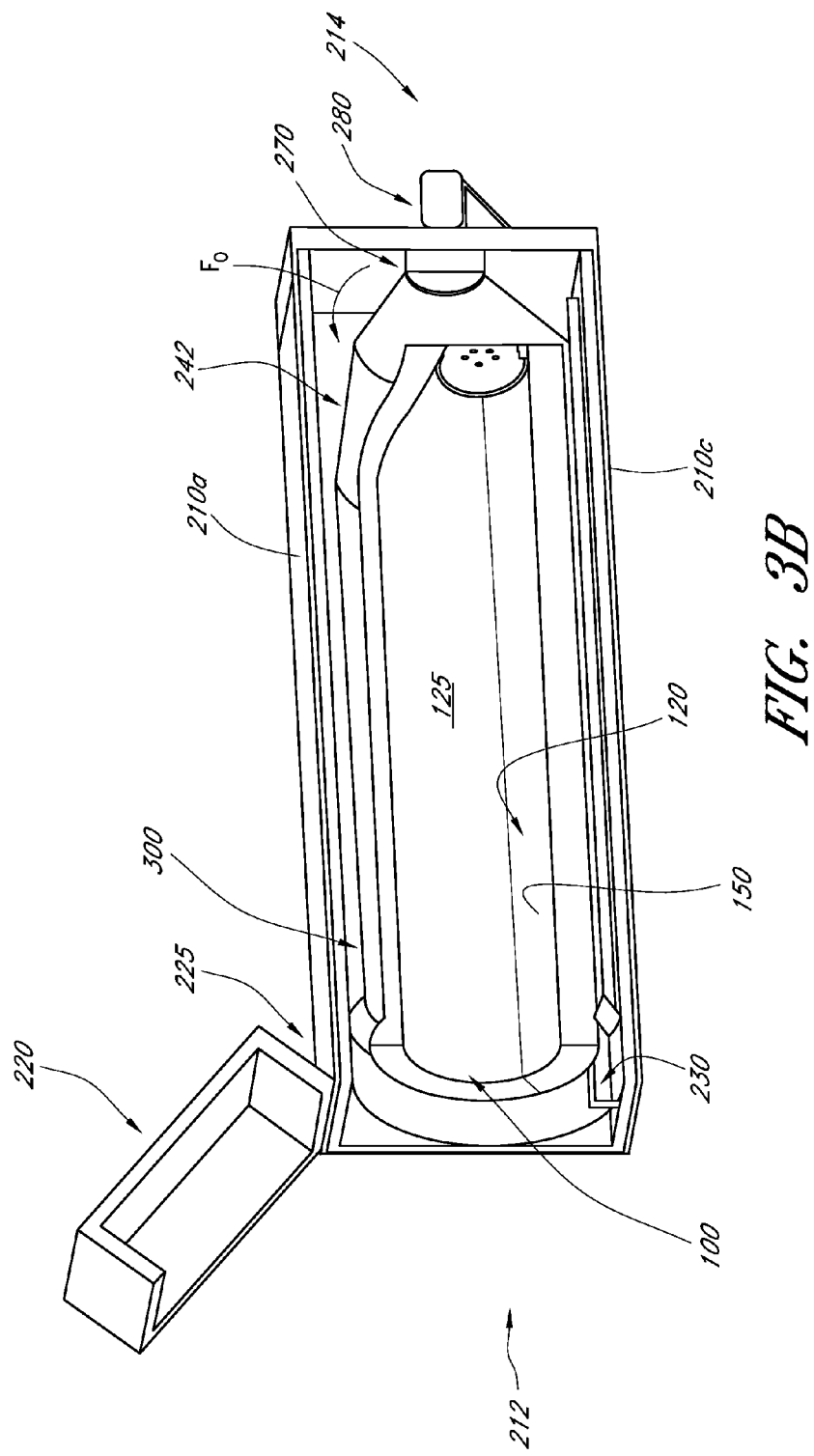
FIG. 3B is a schematic cross-sectional perspective view of the industrial oven and shroud of FIG. 3A.
Figure 4:
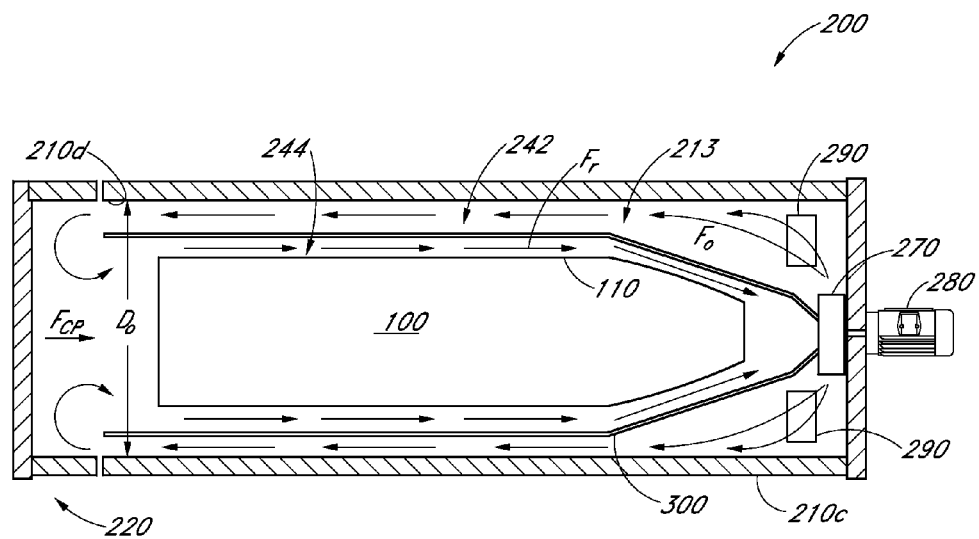
FIG. 4 is a schematic cross-sectional top plan view of the oven and shroud of FIG. 3 during operation.

FIGS. 3A-4 illustrate one embodiment of an industrial oven 200 for use with the tool 100 to cure the composite material part 150 attached to the tool 100. The oven 200 includes an oven body 210 that extends between a proximal front end 212 and a distal closed end 214. In the illustrated embodiment, the oven body 210 has a generally rectangular shape with a length $L_o$, a width $W_o$ and a height $H_o$ defined by the top surface 210a, side surfaces 210b and bottom surface 210c of the oven body 210. In one embodiment, the length $L_o$ can be between about 30 feet and about 60 feet. In another embodiment, the length $L_o$ can be about 45 feet. In one embodiment, the height $H_o$ is between about 10 feet and about 30 feet. In another embodiment, the height $H_o$ is about 20 feet. However, in other embodiments, the oven 200 can have other suitable length $L_o$ and/or height $H_o$ values smaller or larger than those above. Additionally, in other embodiments, the oven body 210 can have other suitable shapes, such as oval or cylindrical. In one embodiment, the oven body 210 can be made of steel, such as 14 gauge steel. In other embodiments, the oven body 210 can be made of other metal or metal alloy materials.

The oven body 210 has a compartment 213 that extends from an opening 211 at the proximal end 212 of the oven body 210 and along the length of the oven body. In one embodiment, the compartment 213 can have a circular cross-section transverse (e.g., perpendicular) to the longitudinal axis of the oven body 210. In another embodiment, the transverse cross-section of the compartment 213 can be square, rectangular, oval, or any other suitable shape. In one embodiment, the compartment 213 can have a cross-sectional effective diameter $D_o$ transverse to the longitudinal axis of the oven 200 of between about 8 feet and about 15 feet. In another embodiment, the cross-sectional effective diameter $D_o$ can be about 12 feet. However, the compartment 213 can have other suitable effective diameter $D_o$ values smaller or larger than those above. In one embodiment, the opening 211 can be closed with a door 220 attached to the oven body 210. For example, the door 220 can be attached to the oven body 210 by a hinge 225, latch mechanism, or other suitable fasteners. In the illustrated embodiment, the door 220 is shown as pivotally attached to the top of the oven body 210. However, in other embodiments, the door 220 can be pivotally or slidably attached to one or more sides of the oven body 210.

In one embodiment, the oven body 210 can include one or more rails 230 disposed on the bottom surface 210c that extend along at least a portion of the length $L_o$ of the oven body 210. The one or more rails 230 can support the tool 100 within the compartment 213, as well as help guide the tool 100 during its insertion and withdrawal from the oven 200. In the illustrated embodiment, the distal end 114 of the tool 100 is proximate the opening 211 of the oven body 210. In another embodiment, the tool 100 can be positioned in the compartment 213 of the oven body 210 so the proximal end 112 of the tool 100 is proximate the opening 211. A shroud 300 can be disposed in the oven 200 between an inner wall 210d of the oven body 210 and the tool 100. In one embodiment, the inner wall 210d of the oven body 210 can define one or more of the sides, top and bottom surfaces of the compartment 213. In one embodiment, the inner wall 210d can be made of aluminized steel, such as 18 gauge aluminized steel. In another embodiment, the inner wall 210d can be made of other suitable metal or metal alloy materials. In some embodiments, the inner wall 210d can be insulated.

With reference to FIGS. 3B-4, the oven 200 can also include one or more fans 270 attached to the distal end 214 of the oven body 210 and driven by a motor 280, which in one embodiment can be an electric motor. In the illustrated embodiment, the oven 200 has one fan 270 mounted at the distal end 214. In one embodiment, the fan 270 can circulate air over one or more heaters 290 and direct a heated airflow $F_o$ toward the proximal end 212 longitudinally along an annulus 242 between the inner wall 210d of the oven body 210 and the shroud 300. In one embodiment, the one or more heaters 290 are electric heaters with a capacity of between about 200 kW and about 800 kW. In another embodiment, the heaters 290 have capacity of about 500 kW. However, the one or more heaters 290 can be other suitable type of heaters and/or have capacities smaller or greater than the values above. Additionally, the motor 280 need not be an electric motor and can be any other suitable type of motor.

In one embodiment, the oven 200 can be operated via a control system (e.g., computer controller). One suitable control system is a CPC computer-control system from ASC Process Systems of Sylmar, Calif., which can control all aspects of oven operation. The control system for the oven 200 can in one embodiment include a redundant control system for added reliability. In one embodiment, the redundant control system can be a CPC Level II system.

In one embodiment, the operation of the fan 270 can be controlled via one or more controllers, such as computer controllers having or more processors. Said computer controller can in one embodiment have a wired connection to the fan motor 280. In another embodiment, the computer controller can wirelessly (e.g., via Rf communication) control the operation of the fan motor 280. In one embodiment, the computer controller uses one or more computer algorithms to control the operation of the fan motor 280 and or heater 290 to vary the velocity and/or temperature of the airflow $F_o$. For example, the algorithms can control one or more parameters of the fan motor 280, such as motor speed, and/or one or more parameters of the heater 290, such as energy output. In one embodiment, the algorithms control the operation of the fan motor 280 and/or heater 290 based at least in part on sensed characteristics of the heated airflow $F_o$ and/or shroud airflow $F_r$ (e.g., via feedback control from signals provided by sensors disposed in the compartment 213 of the oven 200). Such sensed characteristics can include airflow temperature, which can be sensed with one or more thermocouples in the compartment 213 that communicate with the computer controller (e.g., in a wired or wireless manner). In another embodiment, said sensed characteristics can include airflow velocity or flow rate.

Once the heated airflow $F_o$ reaches the proximal end 212, at least a portion of the heated airflow $F_r$ is redirected by the door 220 toward the distal end 214 longitudinally along an annulus 244 between the shroud 300 and the outer surface 110 of the tool 100, transferring heat to the tool 100 as the airflow $F_r$ travels toward the distal end 214. In one embodiment, the at least a portion of the airflow $F_r$ is redirected toward the distal end 214 by vanes or buckets (not shown) on the door 220. Another portion $F_{CP}$ of the airflow $F_o$ that is redirected by the door 220 flows within the longitudinal channel 125 of the tool 100. As the airflow $F_r$ passes over the front end 112 of the tool 100, the airflow $F_r$ is drawn along with the flow $F_{CP}$ by the fan 270 through the shroud 300, again circulated over the one or more heaters 290 and once again directed toward the proximal end 212 of the oven 200. Accordingly, the airflow circulation system in one embodiment is a closed-loop system. In another embodiment, the airflow circulation system can be an open loop system where the airflow $F_r$, $F_{CP}$ drawn by the fan 270 through the shroud 300 is expelled to the atmosphere, the fan 270 drawing a separate volume of air from outside the oven 200 and circulating it over the heaters 290 as discussed previously.

With continued reference to FIG. 4, the fan 270 can operate at a specific flow rate. In one embodiment, the fan 270 can operate at a generally constant flow rate of between about 40,000 scfm and about 80,000 scfm. In another embodiment, the fan 270 can operate at a flow of about 70,000 scfm. However, in other embodiments, the fan 270 can operate at flows smaller or larger than those given above, as well as at non-constant flow-rates (e.g., the operation of the fan 270 can be controlled by a controller, such as a computer controller, based on sensed feedback). In one embodiment, the fan 270 can be a centrifugal fan. However, in other embodiments, the fan 270 can be other suitable types.

In a preferred embodiment, the shroud 300 is designed to correspond to the shape of the tool 100 so that the annulus 244 between the shroud 300 and the outer surface 110 of the tool 100 is dimensioned to achieve a desired flow rate $F_r$ within the annulus 244, and thereby achieve a desired convection heat transfer rate $Q_{CT}$ from the airflow $F_r$ to the tool 100. In one embodiment, the shroud 300 is dimensioned so that the velocity of the shroud airflow $F_r$ within the annulus 244 (e.g., air-speed across the tool 100) is about 1000 ft/min or greater. In another embodiment, the shroud 300 is dimensioned so that the air velocity within the annulus 244 is about 1200 ft/min or greater. In still other embodiments, the velocity of the shroud airflow $F_r$ within the annulus 244 is higher or lower than the values above.

In a preferred embodiment, a computational fluid dynamics (CFD) model of the tool 100 and oven 200 is generated, and flow and heat transfer patterns simulated to evaluate the shape of the shroud 300 to establish a shape for the shroud 300 that will achieve the desired convection heat transfer rate $Q_{CT}$ from the shroud airflow $F_r$ to the tool 100 to achieve a generally uniform temperature increase and desired heat-up rate along the length $L_T$ of the tool 100 to cure the composite material part 150. The CFD model can also determine the amount of flow $F_{CP}$ needed to achieve a convection heat transfer rate $Q_{CP}$ to the composite material part 150 that is generally equal to the conduction heat transfer rate $Q_t$ conducted to the composite material part 150 by the tool 100, wherein the conduction heat transfer rate $Q_t$ is generally equal to the convection heat transfer rate $Q_{CT}$ from the shroud airflow $F_r$ to the tool 100 less any energy stored or absorbed by the tool 100. Any suitable CFD software (e.g., FLUENT®, Cfdesign®, etc.) can be used to determine the shape of the shroud 300 to meet the desired heat-up parameters.

In one embodiment, with the shroud 300 disposed between the inner wall 210d of the oven 200 and the tool 100, the oven 200 can achieve a desired heat-up rate of the composite material part 150 while maintaining a generally uniform temperature $T_p$ along the length of the composite material part 150 during the curing process. In one embodiment, the oven 200 can achieve an average heat-up rate in the composite material part 150 of between about 2° F./min and about 5° F./min from ambient temperature to the cure temperature. In another embodiment, the oven 200 can achieve an average heat-up rate in the composite material part 150 of between about 2° F./min and about 3° F./min from ambient temperature to the cure temperature. In still another embodiment, the oven 200 can achieve a heat-up rate in the composite material part 150 of about 2.5° F./min from ambient temperature to the cure temperature. However, in other embodiments, the oven 200 can achieve other heat-up rates that are higher or lower than the values above. In one embodiment, the cure temperature can be between 200° F. and about 400° F. In another embodiment, the cure temperature can be about 300° F. However, in other embodiments, the cure temperature can be lower or higher than the values above.

In one embodiment, the oven can have a maximum operating temperature of about 500° F./min and the temperature of the shroud airflow $F_r$ can be maintained at between about 30° F. and about 80° F. above the temperature $T_P$ of the composite material part 150 and/or tool 100. In another embodiment, the temperature of the shroud airflow $F_r$ can be maintained at between about 50° F. and about 60° F. above the temperature $T_P$ of the composite material part 150 and/or tool 100. However, in other embodiments, the oven 200 can have a maximum operating temperature lower or greater than this value and the temperature of the shroud airflow $F_r$ maintained at temperatures lower or higher than the values above.

As noted above, in one embodiment the shroud 300 has a shape that is optimized using a CFD analysis to achieve the desired heat-up rate of the composite material part 150 in the oven 200 during the curing process. Said optimized shape advantageously facilitates the desired heat-up with the longitudinally directed shroud airflow $F_r$ while minimizing thermal non-uniformity in the composite material part 150 that may cause warping, as discussed above. In one embodiment, the shroud 300 is designed to achieve a surface temperature non-uniformity in the composite material part 150 of between about 30° F. and about 40° F. along the length $L_T$ of the tool 100, based on a heat-up rate of 2° F./min. However, in other embodiments, the shroud 300 can be designed to achieve a surface temperature non-uniformity in the composite material part 150 that is higher or lower than the values above along the length $L_T$ of the tool 100.

Once the curing process is complete, the oven 200 can be operated to cool the composite material part 150 from the cure temperature. In one embodiment, the oven 200 can achieve an average cooling rate in the composite material part 150 of between about 2° F./min and about 5° F./min from the cure temperature to a temperature of about 150° F. or lower. In another embodiment, the oven 200 can achieve an average cooling rate in the composite material part 150 of between about 2° F./min and about 3° F./min from the cure temperature to a temperature of about 150° F. or lower. In still another embodiment, the oven 200 can achieve a cooling rate in the composite material part 150 of about 2.5° F./min. However, in other embodiments, the oven 200 can achieve other cooling rates that are higher or lower than the values above.

Figure 5:
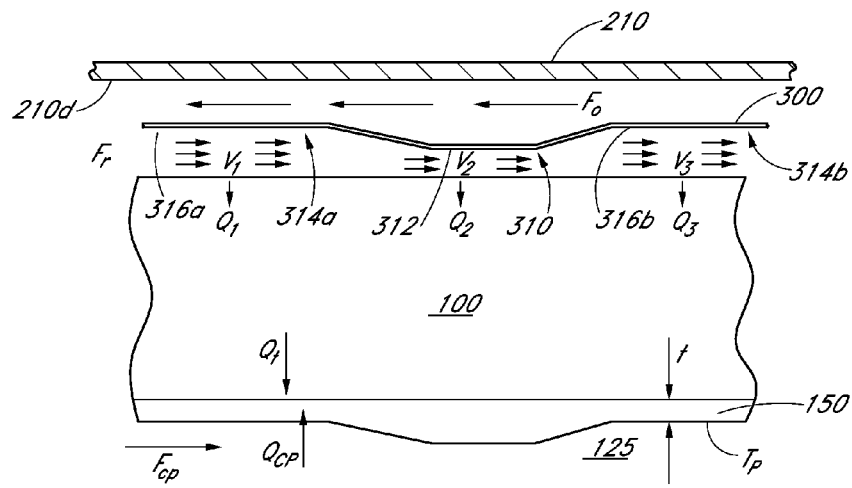
FIG. 5 is a schematic sectional view of another embodiment of an oven and shroud.

With reference to FIG. 5, in one embodiment, the shroud 300 can have one or more recessed sections 310 along the length of the shroud 300 so that an inner surface 312 of the shroud 300 at the recessed section 310 is closer to the outer surface 110 of the tool 100 than an inner surface 316 of one or more sections adjacent to the recessed section 310. In the illustrated embodiment, a recessed section 310 of the shroud 300 is in between two adjacent sections 314a, 314b, and the inner surface of the shroud 300 transitions from the inner surface 316a of the first adjacent section 314a to the inner surface 312 of the recessed portion 310 and then to the inner surface 316b of the second adjacent section 314b. The shroud airflow $F_r$ that flows between the shroud 300 and the outer surface 110 of the tool 100 can have a first velocity $V_1$ in the first adjacent section 314a, which effects a first convection heat transfer rate $Q_1$ from the airflow $F_r$ to the tool 100. In the illustrated embodiment, the velocity of the airflow $F_r$ increases in the recessed section 310 to a second velocity $V_2$ that is greater than the first velocity $V_1$ due to the smaller gap between the inner surface 312 and the outer surface 110 of the tool 100. The higher velocity of the airflow $F_r$ in the recessed section 310 results in a second convection heat transfer rate $Q_2$ from the airflow $F_r$ to the tool 100, where the second heat transfer rate $Q_2$ is greater than the first heat transfer rate $Q_1$. In the illustrated embodiment, the velocity of the airflow $F_r$ then decreases in the second adjacent section 314b to a third velocity $V_3$ that is smaller than the second velocity $V_2$, which effects a third convection heat transfer rate $Q_3$ from the airflow $F_r$ to the tool 100, where the third heat transfer rate $Q_3$ is smaller than the second heat transfer rate $Q_2$. The shroud 300 can therefore have the one or more recessed sections 310 to adjust the convection heat transfer rate $Q_{CT}$ from the shroud airflow $F_r$ to the tool 100 as desired to effect a generally uniform temperature increase in the tool during the curing process. In one embodiment, the recessed section 310 can be formed in the shroud 300 at a location where the thickness t of the composite material part 150 at the same transverse plane is greater, so that more heat transfer is required to heat the composite material part 150 at said location.

Figure 6A:
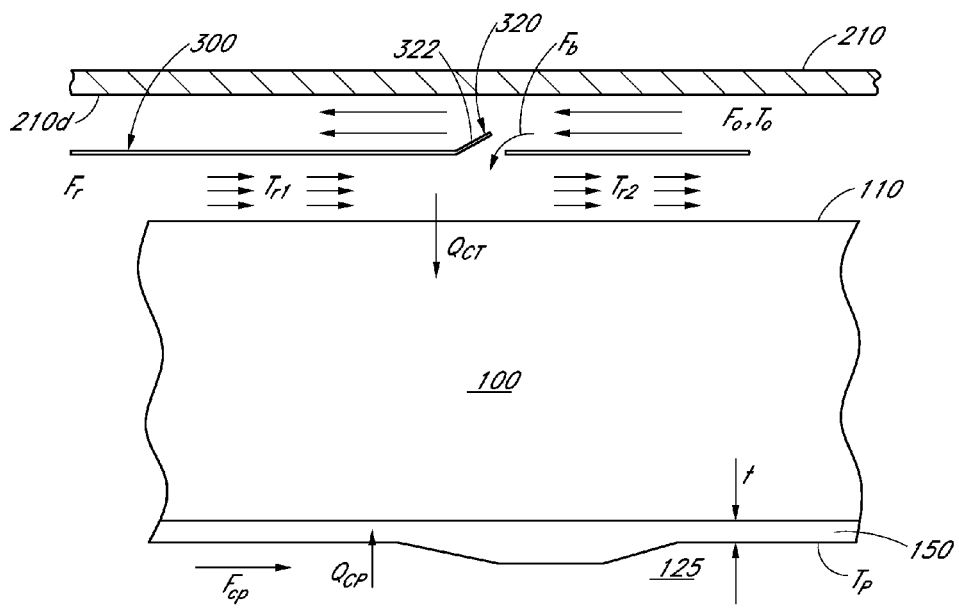
FIG. 6A is a schematic sectional view of another embodiment of an industrial oven and shroud.

As shown in FIG. 6A, in one embodiment, the shroud 300 can have one or more louvers 320 along the length of the shroud 300. In one embodiment, the louvers 320 can have a vane or blade 322 with a fixed orientation. In another embodiment, the vane or blade 322 of the louvers 320 can be adjustable and positionable in a variety of orientations, as desired. The louvers 320 can allow a portion of the heated airflow $F_o$ between the inner wall 210$d$ of the oven body 210 and the shroud 300 to be redirected as bypass airflow $F_b$ into the shroud airflow $F_r$ between the shroud 300 and the tool 100. Where the length $L_T$ of the tool 100 is such that the temperature of the shroud airflow $F_r$ decreases as it flows toward the proximal end 212 of the oven 200 due, for example, to energy being absorbed by the tool 100 and composite material part 150, the louvers 320 can inject a portion of the heated airflow $F_o$ into the shroud airflow $F_r$ to increase the temperature of the shroud airflow $F_r$ from a temperature $T_{r1}$ upstream of the louver 320 to a temperature $T_{r2}$ downstream of the louver 320, where $T_{r2}$ is greater than $T_{r1}$, thereby increasing the convection heat transfer rate $Q_{CT}$ from the shroud airflow $F_r$ to the composite material part 150 via the tool 100. The bypass airflow $F_b$ can also increase the local turbulence of the shroud airflow $F_r$ proximate and downstream of the location louver 320, which can also contribute to an increase in the convection heat transfer rate $Q_{CT}$ from the shroud airflow $F_r$ to the composite material part 150 via the tool 100. Advantageously, the louvers 320 can facilitate maintaining a generally uniform temperature increase or heat-up of the composite material part 150 during the curing process, and help counteract heat losses due to the length $L_T$ of the tool 100.

Figure 6B:
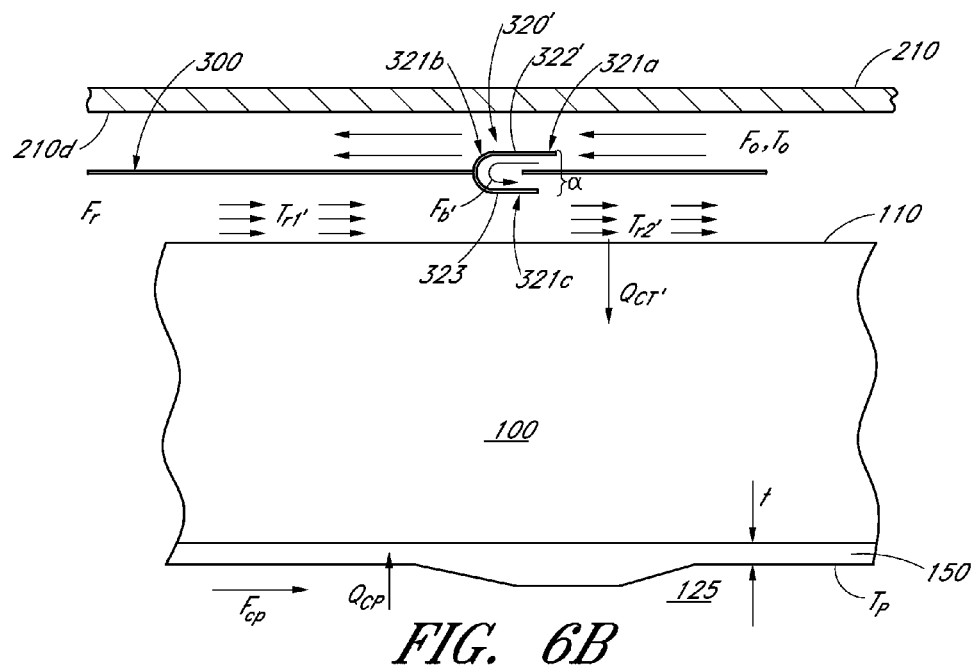
FIG. 6B is a schematic sectional view of another embodiment of an industrial oven and shroud.

With reference to FIG. 6B, the shroud 300 can have one or more vanes or scoops 320' at desired locations on the shroud 300 and allow a portion of the heated airflow $F_o$ between the inner wall 210$d$ of the oven body 210 and the shroud 300 to be redirected as bypass airflow $F_{b'}$ into the shroud airflow $F_r$ between the shroud 300 and the tool 100. In one embodiment, the one or more scoops 320' can have an entry passage 321$a$ between the inner wall 210$d$ of the oven body 210 and the shroud 300, and an exit passage 321$c$ between the shroud 300 and the tool 100. In one embodiment, the entry passage 321$a$ can be defined by a wall or boundary 322' that is generally parallel to the shroud 300 at a location of the scoop 320'. In another embodiment, the entry passage 321$a$ can be defined by a wall 322' at an angle relative to the shroud 300 at the location of the scoop 320'. The entry passage 321$a$ can transition into a curved section 321$b$ that redirects the flow from the channel between the inner wall 210$d$ and shroud 300 into the channel between the shroud 300 and tool 100. The curved section 321$b$ can then transition into the exit passage 321$c$. In one embodiment, the exit passage 321$c$ can be defined by a wall 323 generally parallel to the shroud 300 at the location of the scoop 320'. In another embodiment, the exit passage 321$c$ can be defined by a wall 323 at an angle relative to the shroud 300 at the location of the scoop 320'. In one embodiment, the one or more scoops 320' can redirect the bypass air flow $F_{b'}$ over an angle $\alpha$ of between about 170° and about 180°. In another embodiment, the one or more scoops 320' will redirect the bypass airflow $F_{b'}$ over an angle $\alpha$ of 180°. In still another embodiment, the one or more scoops 320' will redirect the bypass airflow $F_{b'}$ over an angle $\alpha$ smaller or greater than the values given above. In one embodiment, the one or more scoops 320' can have a width (e.g., into the page in FIG. 6B) defined by an arc of between about 10°-40° about the axis of the shroud 300. In another embodiment, the one or more scoops 320' can have a width defined by an arc of about 20° about the axis of the shroud 300. However, in other embodiments, the one or more scoops 320' can have a width defined by an arc having an angle smaller or greater than the values above. The bypass flow $F_{b'}$ can increase the temperature of the shroud airflow $F_r$ from a temperature $T_{r1'}$ upstream of the scoop 320' to a temperature $T_{r2'}$ downstream of the scoop 320', where $T_{r2'}$ is greater than $T_{r1'}$, thereby increasing the convection heat transfer rate $Q_{CT'}$ from the shroud airflow $F_r$ to the composite material part 150 via the tool 100.

In one embodiment, said louvers 320 and/or scoops 320' can be formed on the shroud 300 at locations where the thickness t of the composite material part 150 at the same transverse plane is greater, so that more heat transfer is required to heat the composite material part 150 at said location. In another embodiment, said louvers 320 and/or scoops 320' can be formed on the shroud 300 at locations where there is an upstream longitudinal blockage (e.g., caused by the frame of the tool 100) that diminishes the amount of annular airflow $F_r$ at said location.

Figure 7:
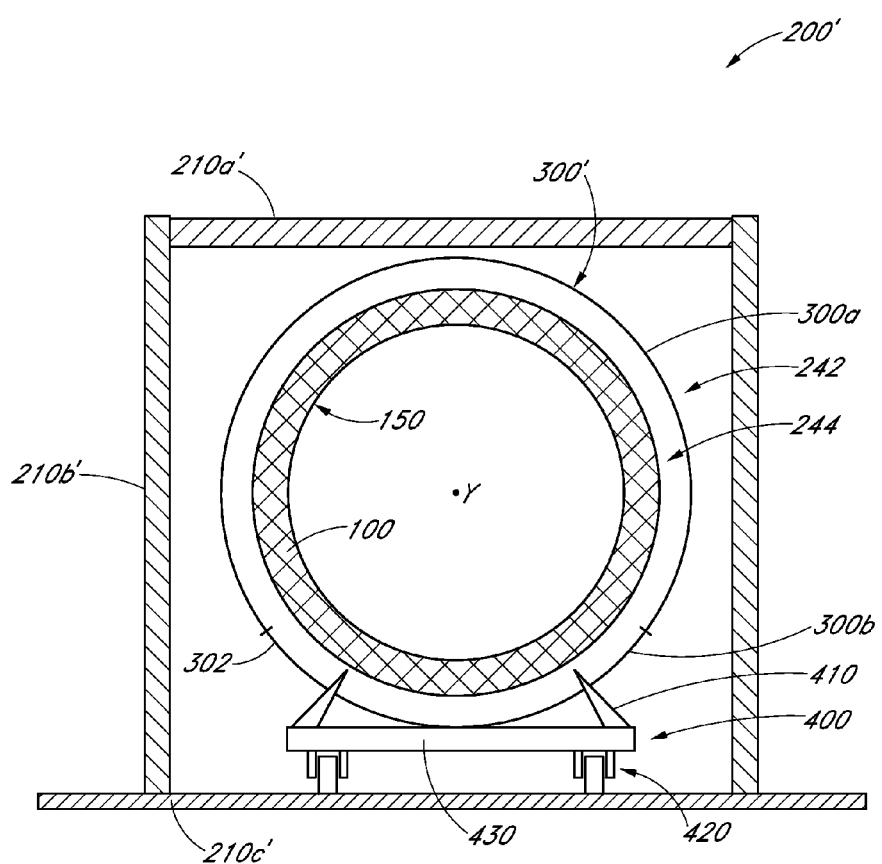
FIG. 7 is a schematic cross-sectional front view of another embodiment of an industrial oven.

FIG. 7 is a cross-sectional front view of another embodiment of an industrial oven 200' that can be used to cure the composite material part 150 mounted to the tool 100. The oven 200' is similar to the oven 200, except as noted below. Thus, the reference numerals used to designate the various components of the oven 200' are identical to those used for identifying the corresponding components of the oven 200 in FIGS. 3A-4, except that a "'" has been added to the reference numerals.

In the illustrated embodiment, a support structure 400 can be used to support the tool 100 and composite material part 150 via one or more support members 410 (e.g., struts) removably attached to the tool 100 along the length $L_T$ of the tool 100. The support structure 400 can include a platform 430 (e.g., a generally planar platform) that extends along at least a portion of the length $L_T$ of the tool 100. In one embodiment, the support structure 400 is moveable and can have one or more wheels 420 (e.g., caster wheels) for rolling the support structure 400 and tool 100 into the oven 200'. In another embodiment, the support structure 400 can include an automated guide vehicle for guiding the support structure 400 and tool 100 into the oven 200'. The support structure 400 can extend along substantially the entire length $L_T$ of the tool 100 and support a tool 100 and composite material part 150 weighing 50,000 lbs or more.

With continued reference to FIG. 7, the shroud 300' can include one or more parts. In the illustrated embodiment, the shroud 300' can include an upper section 300$a$ and a separate lower section 300$b$, where the upper and lower sections 300$a$, 300$b$ can be aligned and attached to each other along an axis of the shroud 300', which in FIG. 7 extends normal to the page at point Y, so as to form a shroud assembly with a generally circular cross-sectional profile normal to the axis of the shroud 300'.

In one embodiment, the upper section 300$a$ can be attached to the oven 200' (e.g., coupled to a duct at the distal end 214' of the oven 200' via any suitable mechanism (e.g., bolts, clamps, welds). The lower section 300$b$ can be attached to the support structure 400. For example, the lower section 300$b$ can be at least partially supported by the platform 430, and can be inserted into the oven 200' along with the support structure 400 and tool 100 and coupled to the upper section 300$a$ in situ. In another embodiment, the upper section 300$a$ and lower section 300$b$ can be attached to each other outside of the oven 200', and the support structure 400 along with the tool 100 and the assembled shroud 300' can then be inserted into the oven 200' and the assembled shroud 300' attached to the oven 200' (e.g., to a duct at the distal end 214' of the oven 200'). In still another embodiment, the upper section 300$a$ and lower section 300$b$ of the shroud 200' can be one piece and attached to the tool 100 and supported by the support structure 400. The shroud 300' can then be inserted along with the tool 100 and support structure 400 into the oven 200' and the shroud 300' removably coupled to the oven 200', as discussed above.

Figure 8:
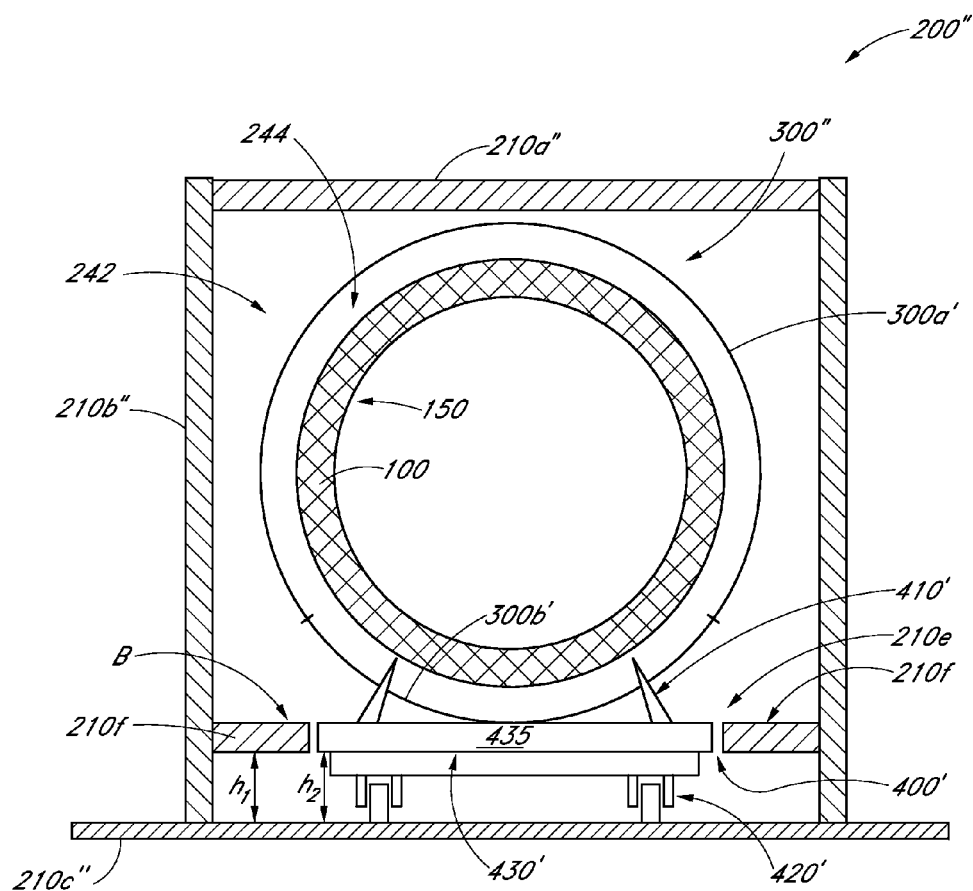
FIG. 8 is a schematic cross-sectional front view of another embodiment of an industrial oven.

FIG. 8 is a cross-sectional front view of another embodiment of an industrial oven 200" that can be used to cure the composite material part 150 mounted to the tool 100. The oven 200" is similar to the oven 200', except as noted below. Thus, the reference numerals used to designate the various components of the oven 200" are identical to those used for identifying the corresponding components of the oven 200' in FIG. 7, except that a """ has been added to the reference numerals.

In the illustrated embodiment, the platform 430' of the support structure 400' can include an insulated support section 435 that can support at least a portion of the lower section 300b' of the shroud 300". The oven 200" can have one or more elevated floor sections 210f above the bottom surface 210c" that extends along at least a portion of the length $L_o$" of the oven 200". In the illustrated embodiment, the oven 200" has two elevated floor sections 210f that preferably laterally align with the insulated support section 435 when the support structure 400' is disposed in the oven 200" so that the elevated floor sections 210f and the insulated support section 435 provide a generally continuous bottom wall B of the oven 200", where the remainder of the support structure 400', including the wheels 420', are below said bottom wall B. In one embodiment, the bottom wall B can be substantially planar. In one embodiment, the one or more elevated floor sections 210f are insulated and can be disposed a height $h_1$ above the bottom surface 210c", where said height $h_1$ is generally equal to a height $h_2$ from the bottom surface 210c" to the insulated support section 435.

In one embodiment, the insulated support section 435 and the one or more elevated floor sections 210f can form a temperature seal 210e therebetween that inhibits heat loss between the insulated support section 435 and the one or more elevated floor sections 210f. In another embodiment, the temperature seal 210e can be a separate component disposed between the insulated support section 435 and the one or more elevated floor sections 210f. Advantageously, the bottom wall B formed by the insulated support section 435 and the one or more elevated floor sections 210f inhibits the bottom portion of the support structure 400 from interfering with the heated airflow $F_o$ that flows between the inner wall 210a of the oven 200" and the shroud 300" since it is disposed below the planar bottom wall B. Additionally, because the bottom portion of the support structure 400' is not exposed to the heated airflow $F_o$ loss of heat in the airflow due to the heating of the support structure 400' is advantageously minimized.

Figure 9:
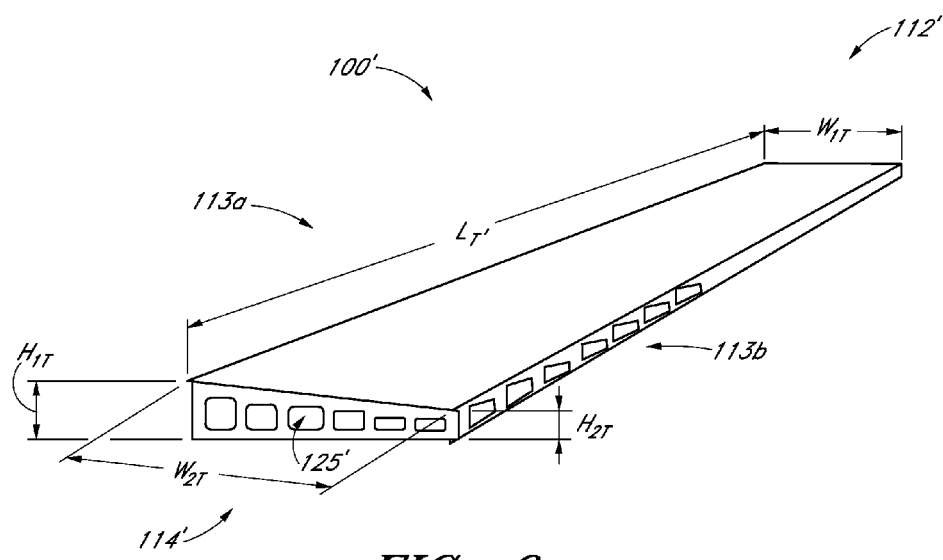
FIG. 9 is a schematic perspective view of another embodiment of an elongate tool for use with an industrial oven.
Figure 10:
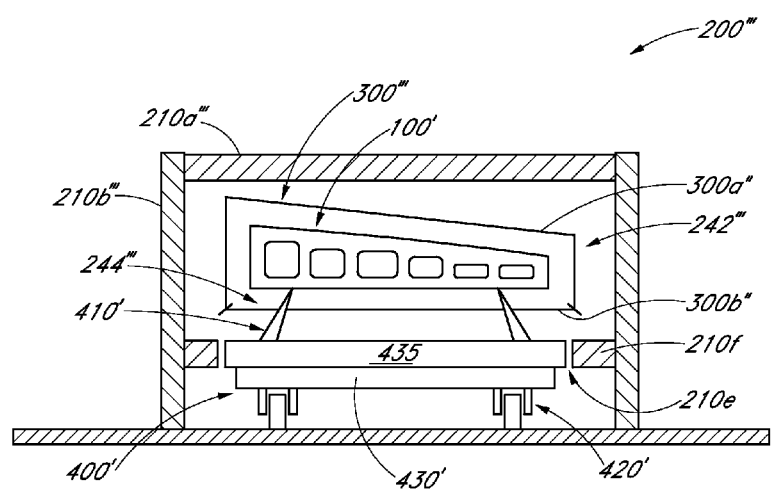
FIG. 10 is a schematic cross-sectional front view of another embodiment of an industrial oven and shroud design for use with the tool of FIG. 9.

FIGS. 9-10 show another embodiment of a tool 100' for use with an industrial oven 200'". The oven 200'" is similar to the oven 200", except as noted below. Thus, the reference numerals used to designate the various components of the oven 200'" are identical to those used for identifying the corresponding components of the oven 200" in FIG. 8, except that a """ has been added to the reference numerals.

In the illustrated embodiment, the tool 100' has an elongate and generally planar body that extends along a length $L_T$'. The tool 100' can have a first width $W_{1T}$ at the proximal end 112' and a second width $W_{2T}$ at the distal end 114'. In one embodiment, the first and second widths $W_{1T}$, $W_{2T}$ are the same so that the tool 100' has a generally constant width transverse to its longitudinal axis. In another embodiment, the first and second widths $W_{1T}$ and $W_{2T}$ are different and the width of the tool 100' varies along its length $L_T$'. With continued reference to FIG. 9, in one embodiment the tool 100' has a first height $H_{1T}$ at one side 113a of the tool 100' and a second height $H_{2T}$ at an opposite side 113b of the tool 100'. In one embodiment, the first and second heights $H_{1T}$, $H_{2T}$ are the same so that the tool 100' has a generally constant height along its length $L_T$' and across its width. In another embodiment, the first and second heights $H_{1T}$, $H_{2T}$ are different, and the height of the tool 100' varies between said sides 113a, 113b of the tool 100'. The tool 100' can have one or more openings 125' therein to allow air to flow though the tool 100' during the curing process. In the illustrated embodiment, the tool 100' can be used to support an aircraft wing composite material part thereon (e.g., on an underside of the tool 100').

As shown in FIG. 10, the shroud 300'" can have an upper section 300a" and a bottom section 300b" that can be attached together along at least a portion of the length of the shroud 300'". As discussed above, in one embodiment the upper section 300a" can be attached to the rear end 214'" of the oven 200'" and the bottom section 300b" can be attached to the support structure 400', the top and bottom sections 300a", 300b" coupleable to each other in situ once the support structure 400' is inserted into the oven 200'". In another embodiment, the upper and lower sections 300a", 300b" of the shroud 300'" can be coupled together outside of the oven 200'", and the assembled shroud 300'" introduced along with the tool 100' and support structure 400' into the oven 200'" at the same time. As discussed above, the shroud 300'" preferably has a shape suitable to achieve the desired heat transfer rate $Q_{CT}$'" from the shroud airflow $F_r$ that flows through the annulus 244'" to the tool 100", said heat transfer rate achieving a generally uniform temperature increase and heat up of the composite material part on the tool 100" along the length $L_T$' of the tool 100" during the curing process of the composite material part. In one embodiment a CFD analysis of the tool 100' can be performed to determine the shape of the shroud 300'" that will achieve said generally uniform temperature increase and heat up of the composite material part.

Of course, the foregoing description is that of certain features, aspects and advantages of the present invention, to which various changes and modifications can be made without departing from the spirit and scope of the present invention. Moreover, the industrial oven need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed industrial oven and shroud design.

What is claimed is:

1. An industrial oven system for curing composite material parts, comprising:

an oven compartment having an inner wall that defines a cavity between a proximal end of the compartment and a distal closed end of the compartment, the compartment configured to receive an annular composite material structure therein that extends along a majority of the length and/or width of the compartment, the annular composite material structure having one or more relatively thicker annular portions adjacent one or more relatively thinner annular portions along the length of the annular composite material structure; and a shroud corresponding to the composite material structure and disposed circumferentially between the inner wall of the compartment and an outer wall of the composite material structure along the length of the composite material structure, the shroud defining a first annular channel between the inner wall and an outer surface of the shroud and defining a second annular channel between the outer wall of the composite material structure and an inner surface of the shroud, said channels extending longitudinally between the proximal and distal ends of the compartment, wherein the shroud is contoured to direct a heated airflow longitudinally along the annular channels and over the composite material structure to cure the composite material structure, the heated airflow generally being at a higher temperature than a surface of the composite material structure, one or more contour elements defined by the shroud and located between a proximal end of the shroud and a distal end of the shroud at longitudinal locations on the shroud corresponding to longitudinal locations in the annular composite material structure of one or more relatively thicker annular cross-sections as compared with adjacent longitudinal locations in the annular composite material structure that have relatively thinner annular cross-sections such that the one or more contour elements are aligned with the relatively thicker annular cross-sections along a same transverse plane, the one or more contour elements configured to longitudinally direct heated airflow along the second annular channel at a higher velocity at locations of the second annular channel aligned with said corresponding relatively thicker annular cross-sections of the composite material structure relative to a lower velocity of the heated airflow longitudinally directed along the second annular channel at locations of the second annular channel aligned with said adjacent relatively thinner annular cross-sections of the composite material structure, whereby said higher longitudinal velocity airflow directs relatively more heat to said relatively thicker annular cross-sections and said lower velocity airflow directs relatively less heat to said relatively thinner annular cross-sections so as to effect a desired heating rate of the composite material structure to achieve a substantially uniform temperature along the length of the composite material structure, thereby inhibiting warping of the composite material structure during a curing process.

2. The system of claim 1, wherein at least a portion of the shroud is removably disposed in the compartment.

3. The system of claim 2, wherein at least a portion of the shroud is attached to a support structure, said at least a portion of the shroud positionable along with the composite material structure in the compartment at the same time.

4. The system of claim 1, wherein the one or more contour elements of the shroud are configured to adjust the velocity and/or temperature of the heated airflow between the shroud and the composite material structure to adjust the convection heat transfer rate from said heated airflow to the composite material structure to achieve said substantially uniform temperature increase of the composite material structure along the length of the composite material structure.

5. The system of claim 1, wherein the one or more contour elements of the shroud comprises a recessed portion disposed radially closer to the composite material part than adjacent portions of the shroud.

6. The system of claim 1, wherein the one or more contour elements of the shroud comprises a louver or scoop configured to redirect at least a portion of the heated airflow flowing along the first annular channel into the heated airflow flowing along the second annular channel, thereby increasing the heat transfer to the composite material structure proximate the louver or scoop.

7. The system of claim 1, further comprising a door movably attached to the proximal end of the compartment, the door configured to direct at least a portion of the heated airflow from the first annular channel to the second annular channel when the door is in a closed position to thereby inhibit a loss in the velocity of said heated airflow.

8. The system of claim 7, wherein the door directs a second portion of the heated airflow into a central opening defined by a tool structure that supports the composite material structure, the second annular longitudinal channel defined between the inner surface of the shroud and an outer surface of the tool structure, and wherein said second portion of the heated airflow is configured to flow adjacent the composite material structure at a suitable velocity so that a rate of convection heat transfer to the composite material structure from said second portion of the heated airflow is substantially equal to a rate of conduction heat transfer to the composite material structure from said tool structure.

9. The system of claim 1, further comprising a tool to which the composite material structure is removably attached, the tool disposed between the composite material structure and the inner surface of the shroud.

10. The system of claim 1, wherein the composite material structure weighs at least about 2000 lbs.

11. The system of claim 10, wherein the composite material structure is a fuselage for an aircraft.

12. The system of claim 10, wherein the composite material structure is a wing for an aircraft.

13. The system of claim 3, wherein said at least a portion of the shroud defines a lower portion of the shroud carried by a movable support structure.

14. The system of claim 13, wherein said movable support structure defines at least a portion of an insulated floor section of the compartment.

15. The system of claim 1, further comprising a fan coupled to the distal closed end of the compartment, a peripheral portion of the fan configured to force air past one or more heaters and along the first annular channel to generate the heated airflow, and a central portion of the fan configured to draw airflow about the composite material structure and through the second annular channel.

16. A system for curing composite material parts, comprising:

an elongate shroud positionable circumferentially between an inner wall of an industrial oven compartment and an outer wall of a composite material structure along the length of the composite material structure, the shroud corresponding to the composite material structure and defining a first annular channel between the inner wall and an outer surface of the shroud and defining a second annular channel between the outer wall of the composite material structure and an inner surface of the shroud, said channels extending longitudinally between a proximal end and a distal end of the compartment, wherein the shroud is contoured to direct a heated airflow longitudinally along the annular channels and over the composite material structure to cure the composite material structure, the heated airflow generally being at a higher temperature than a surface of the composite material structure, one or more contour elements defined by the shroud and located between a proximal end of the shroud and a distal end of the shroud at longitudinal locations on the shroud corresponding to longitudinal locations in the annular composite material structure of one or more relatively thicker annular cross-sections as compared with adjacent longitudinal locations in the annular composite material structure that have relatively thinner annular cross-sections such that the one or more contour elements are aligned with the relatively thicker annular cross-sections along a same transverse plane, the one or more contour elements configured to longitudinally direct heated airflow along the second annular channel at a higher velocity at locations of the second annular channel aligned with said corresponding relatively thicker annular cross-sections of the composite material structure relative to a lower velocity of the heated airflow longitudinally directed along the second annular channel at locations of the second annular channel aligned with said adjacent relatively thinner annular cross-sections the composite material structure, whereby said higher longitudinal velocity airflow directs relatively more heat to said relatively thicker annular cross-sections and said lower velocity airflow directs relatively less heat to said relatively thinner annular cross-sections so as to effect a desired heating rate of the composite material structure to achieve a substantially uniform temperature along the length of the composite material structure, thereby inhibiting warping of the composite material structure during a curing process.

17. The system of claim 16, wherein at least a portion of the shroud is removably disposed in the compartment.

18. The system of claim 17, wherein at least a portion of the shroud is attached to a support structure, said at least a portion of the shroud positionable along with the composite material structure in the compartment at the same time.

19. The system of claim 16, wherein the one or more contour elements of the shroud are configured to adjust the velocity and/or temperature of the heated airflow between the shroud and the composite material structure to adjust the convection heat transfer rate from said heated airflow to the composite material structure to achieve said substantially uniform temperature increase of the composite material structure along the length of the composite material structure.

20. The system of claim 16, wherein the one or more contour elements of the shroud comprises a recessed portion disposed radially closer to the composite material part than adjacent portions of the shroud.

21. The system of claim 16, wherein the one or more contour elements of the shroud comprises a louver or scoop configured to redirect at least a portion of the heated airflow flowing along the first annular channel into the heated airflow flowing along the second annular channel, thereby increasing the heat transfer to the composite material structure proximate the louver or scoop.

\* \* \* \* \*

UNITED STATES PATENT AND TRADEMARK OFFICE
CERTIFICATE OF CORRECTION

| | | |
|---|---|---|
| PATENT NO. | : 9,127,888 B2 | Page 1 of 1 |
| APPLICATION NO. | : 12/859148 | |
| DATED | : September 8, 2015 | |
| INVENTOR(S) | : Dave Mason | |

It is certified that error appears in the above-identified patent and that said Letters Patent is hereby corrected as shown below:

In The Specification

In column 3 at line 65, change "FIG. 2" to --FIG. 2.--.

In column 8 at line 12, Change "and or" to --and/or--.

In The Claims

In column 17 at line 25 (approx.), In Claim 16, after "cross-sections" insert --of--.

Signed and Sealed this
Twenty-sixth Day of April, 2016

Michelle K. Lee
*Director of the United States Patent and Trademark Office*